(12) United States Patent
Chen et al.

(10) Patent No.: US 7,623,683 B2
(45) Date of Patent: Nov. 24, 2009

(54) COMBINING MULTIPLE EXPOSURE IMAGES TO INCREASE DYNAMIC RANGE

(75) Inventors: Mei Chen, Palo Alto, CA (US); Qian Lin, Palo Alto, CA (US); Suk Hwan Lim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 761 days.

(21) Appl. No.: 11/403,989

(22) Filed: Apr. 13, 2006

(65) Prior Publication Data

US 2007/0242900 A1 Oct. 18, 2007

(51) Int. Cl.
*G06K 9/00* (2006.01)
*H04N 11/02* (2006.01)

(52) U.S. Cl. .................... 382/107; 382/255; 375/240.16

(58) Field of Classification Search ................. 382/100, 382/103, 106, 107, 162, 168, 181, 191, 194, 382/203, 232, 254, 255, 260, 274, 276, 284–293, 382/299, 305, 312; 375/240.16, 240.12; 348/446
See application file for complete search history.

(56) References Cited

U.S. PATENT DOCUMENTS

| | | | |
|---|---|---|---|
| 6,570,624 B2 * | 5/2003 | Cornog et al. | 348/446 |
| 6,665,450 B1 * | 12/2003 | Cornog et al. | 382/276 |
| 6,879,731 B2 * | 4/2005 | Kang et al. | 382/274 |
| 7,103,231 B2 * | 9/2006 | Cornog et al. | 382/276 |
| 7,308,028 B2 * | 12/2007 | Suh | 375/240.12 |
| 7,548,659 B2 * | 6/2009 | Ofek et al. | 382/254 |
| 2003/0128893 A1 * | 7/2003 | Castorina et al. | 382/284 |
| 2005/0013501 A1 * | 1/2005 | Kang et al. | 382/254 |

OTHER PUBLICATIONS

Goshtasby, A. A., "High Dynamic RangeReduction Via Maximization of Image In-formation.", http://www.cs.wright.edu/agosh-tas/hdr.html, 2003.
Kang et al., "High Dynamic Range Video," ACM Trans. Graph., 22(3):319-325, 2003.
D. Yang and A. El Gamal, "Comparative analysis of SNR for image sensors with widened dynamic range",Proc. SPIE, vol. 3649, pp. 197-211, Feb. 1999.
* cited by examiner

*Primary Examiner*—Seyed Azarian

(57) ABSTRACT

Methods, machines, and machine-readable media for processing multiple exposure source images, including a reference image and one or more non-reference images, are described. In one aspect, respective sets of motion vectors that establish correspondences between respective pairs of the source images are calculated. Ones of the source images are warped to a reference coordinate system based on the sets of motion vectors. For each of the non-reference ones of the warped images, a respective set of one or more measures of alignment confidence between the non-reference warped image and the reference image in the reference coordinate system is computed. Saturated pixels and unsaturated pixels are identified in the warped images. An output image with pixel value contributions from unsaturated pixels in the warped images is generated based on the computed alignment confidence measures.

19 Claims, 11 Drawing Sheets

COMBINING MULTIPLE EXPOSURE IMAGES TO INCREASE DYNAMIC RANGE

BACKGROUND

In general, the dynamic range is a ratio between a maximum and a minimum of a selected physical parameter, where the selected physical parameter depends on the type of data being measured. For a scene, the dynamic range is the ratio between the brightest and darkest parts of the scene. For an image sensor, on the other hand, the dynamic range typically is defined as is the ratio of the intensity that just saturates the image sensor to the intensity that just lifts the image sensor response one standard deviation above camera noise.

The image sensors of most commercially available cameras cannot capture the full dynamic range of a scene. For this reason, images that are acquired by such cameras from a scene containing large variations in light intensity typically fail to capture all the detail of the scene. For example, high luminosity regions of the scene tend to appear uniformly bright and saturated in the acquired images and low luminosity regions of the scene tend to appear uniformly dark in the acquired images.

Many proposals have been made for increasing the dynamic range of images of a scene. Many recent approaches involve combining images of a scene that were acquired at different exposure levels to produce a final image having a higher dynamic range than the constituent images. The multiple exposure constituent images of the scene typically are acquired using a single camera at different capture times. As a result, the corresponding elements of the scene that appear in these images typically are not aligned because of motion of the camera or dynamic elements of the scene. To compensate for such motion-induced misalignment, the constituent images typically are warped to the coordinate system (or reference frame) of one of the constituent images that is designated as the reference image.

The warped images are fused together to produce a high dynamic range final images of the scene. The pixel values in the final image typically are determined from a weighted average of the values of the corresponding pixels of the constituent images. In some approaches, the weights are selected to downplay contributions from pixels of the non-reference ones of the constituent images that have significantly different radiance values than radiance values of the corresponding pixels of the designated reference image. Oftentimes, the fused images that are produced by these methods have visible artifacts, which are caused by inaccurate image alignment or the ways in which the contributions from the constituent multiple exposure images are combined into the fused images.

What are needed are systems and methods of combining multiple exposure images in ways that increase dynamic range while reducing blending artifacts in the final image.

SUMMARY

In one aspect, the invention features methods, machines, and machine-readable media for processing source images including a reference image and one or more non-reference images.

In one aspect of the invention, respective sets of motion vectors establishing correspondences between respective pairs of the source images are calculated. Ones of the source images are warped to a reference coordinate system based on the sets of motion vectors. For each of the non-reference ones of the warped images, a respective set of one or more measures of alignment confidence between the non-reference warped image and the reference image in the reference coordinate system is computed. Saturated pixels and unsaturated pixels are identified in the warped images. An output image with pixel value contributions from unsaturated pixels in the warped images is generated based on the computed alignment confidence measures.

In another aspect of the invention, saliency measures describing local texture content and contrast in local regions of the source images are computed. The saliency measures are assigned to corresponding ones of the pixels in the source images. Saturated pixels and unsaturated pixels in the source images are identified. An output image is generated with pixel value contributions from unsaturated pixels in the source images based on the computed saliency measures.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. OVERVIEW

The image processing embodiments that are described in detail below are able to combine multiple exposure source images in ways that increase dynamic range while reducing blending artifacts in the output image. In these embodiments, the pixel value contributions from the source images to the output image are determined based on one or more respective quality parameter values that are associated with the pixels of the source images. The quality parameters enable these embodiments to increase dynamic range while avoiding blending artifacts that otherwise might result from treating all regions of the scene across the source images in the same way.

Figure 1:
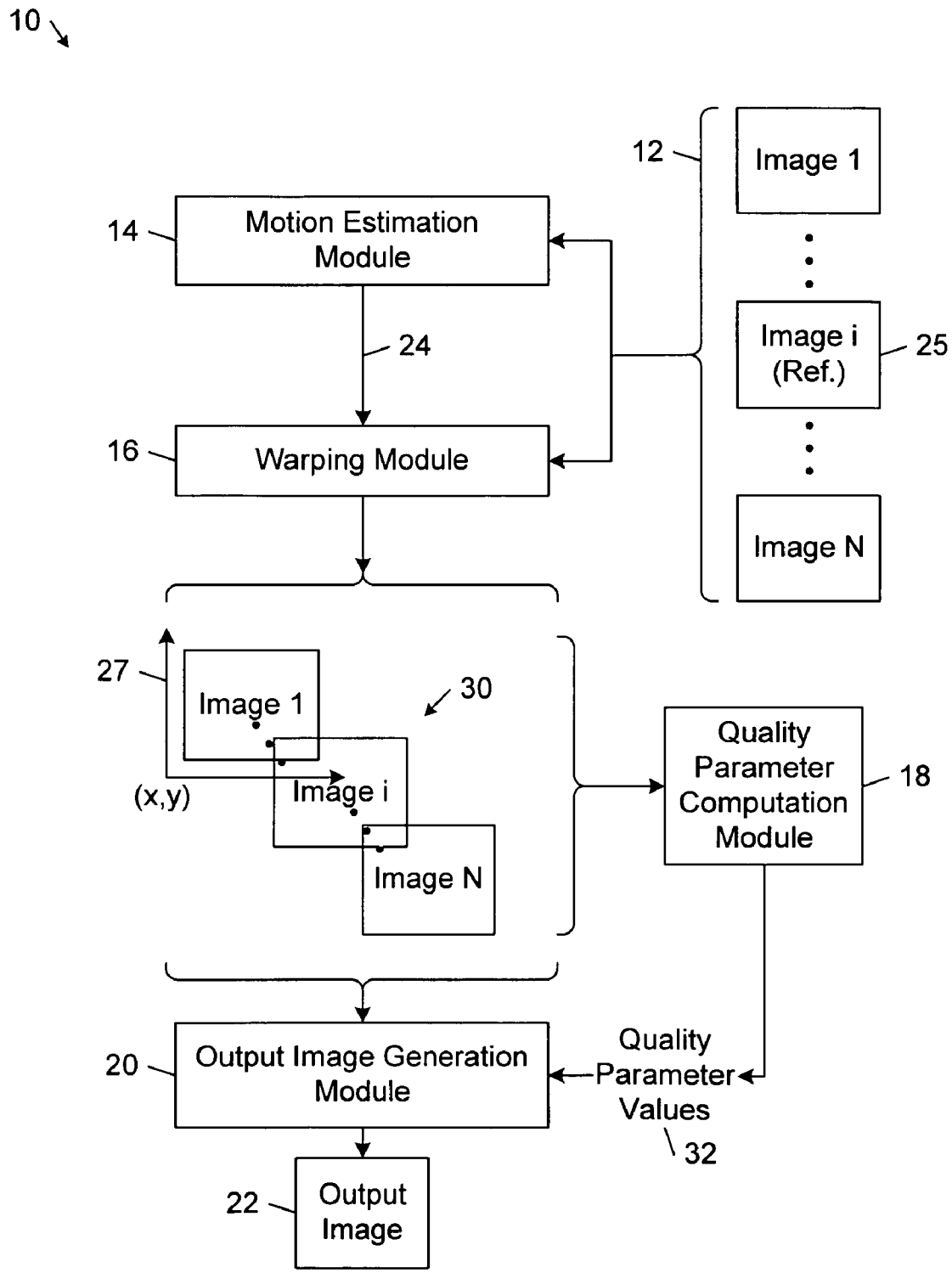
FIG. 1 is a block diagram of an embodiment of an image processing system.

FIG. 1 shows an embodiment of a system 10 for processing a sequence of source images 12. The system 10 includes a motion estimation module 14, a warping module 16, a quality parameter computation module 18, and an output image generation module 20. The system 10 is configured to produce an output image 22 that has a higher dynamic range than the constituent source images 12. In some embodiments of the system 10, the output image 22 has the same spatial resolution as the source images 12. In other embodiments of the system 10, the output image 22 has a higher spatial resolution as the source images 12.

In general, the modules 14-20 of system 10 are not limited to any particular hardware or software configuration, but rather they may be implemented in any computing or processing environment, including in digital electronic circuitry or in computer hardware, firmware, device driver, or software. For example, in some implementations, these modules 14-20 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

In some implementations, computer process instructions for implementing the modules 14-20 and the data generated by the modules 14-20 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD/DVD-ROM.

The source images 12 may correspond to an image sequence that was captured by an image sensor (e.g., a video image sequence or a still image sequence) at different respective exposure levels, or a processed version of such an image sequence. For example, the source images 12 may consist of a sampling of the images selected from an original multiple exposure source image sequence that was captured by an image sensor or a compressed or reduced-resolution version of such a sequence. Typically, at least some of the source images correspond to displaced images of the same scene, in which case the source images 12 may be combined into an enhanced resolution output image, as described in section III below.

In the illustrated embodiments, the output image 22 is produced from pixel value contributions from a selected set of one or more of the source images 12, including one that is designated the "reference image" (e.g., Image i in FIG. 1) and one or more source images that neighbor the reference image in the sequence. The source image sequence typically is ordered in accordance with the exposure level at which the source images 12 were captured. In some embodiments, the reference image corresponds to the source image captured at the median exposure level. In other embodiments, the reference image is selected in another way (e.g., the source image having the largest number of unsaturated pixels). The neighboring source images are source images within a prescribed number of source images of each other in a source image sequence without regard to the temporal ordering of the neighboring source images in terms of capture time. The term "successive source images" refers to adjacent source images in a source image sequence that may be ordered in accordance with either an increasing exposure level or a decreasing exposure level. The number of neighboring source images used to compute the output image 22 and the relative positions of the neighboring source images in the sequence are implementation-specific parameters. In some implementations, from one to three successive neighboring source images on both sides of the reference image in the source image sequence are processed with each reference image, for a total of three to seven source images that are processed for each output image 22.

Figure 2:
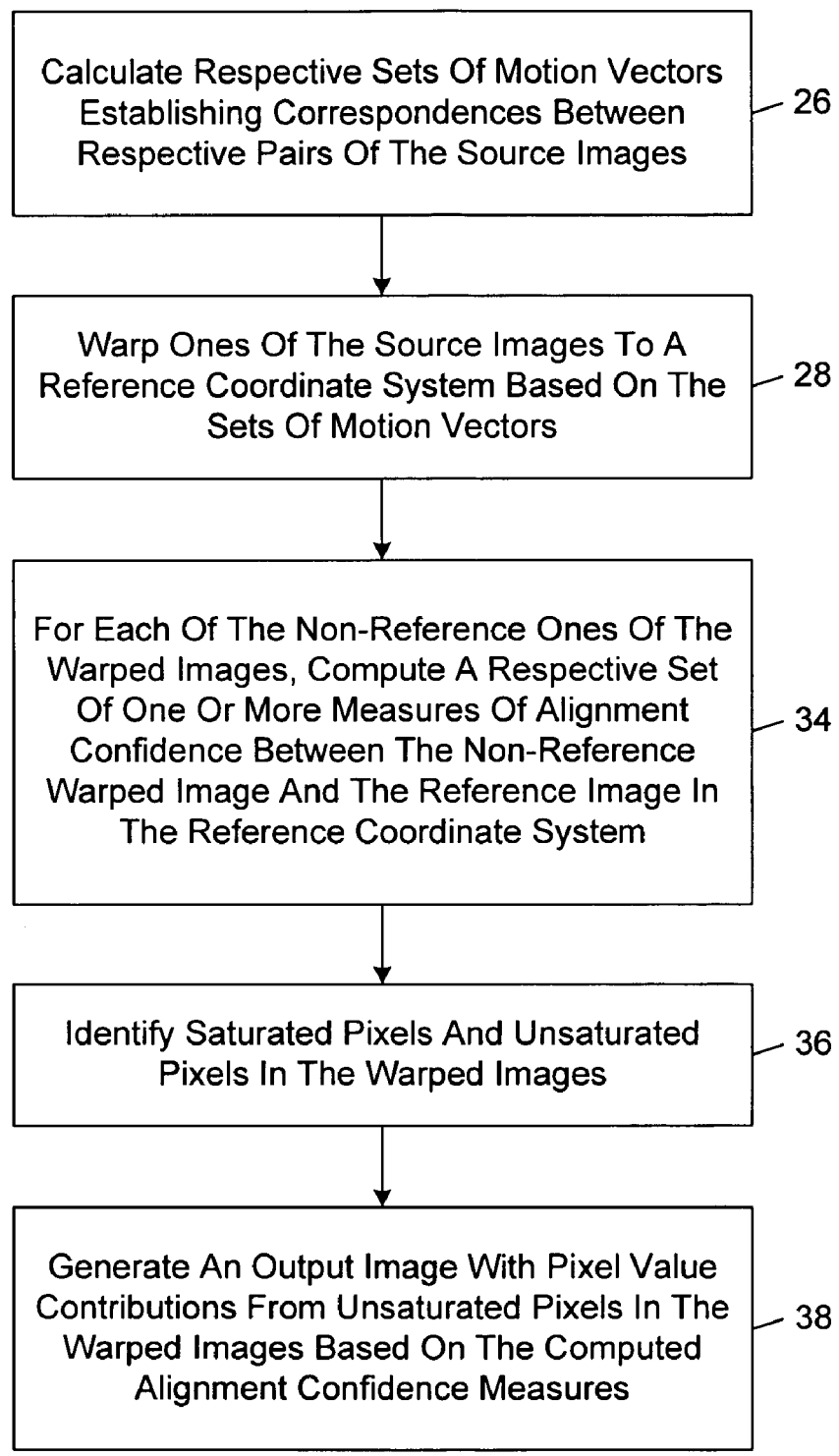
FIG. 2 is a flow diagram of an embodiment of a method of processing sources images to produce an output image having a higher dynamic range.

FIG. 2 shows a flow diagram of an embodiment of a method in accordance with which image processing system 10 processes the source images 12 to produce the output image 22.

The motion estimation module 14 computes respective sets of motion vectors 24 (FIG. 1) that establish correspondences between respective pairs of the source images 12 (FIG. 2, block 26). Each set of motion vectors 24 maps pixels of a respective neighboring image to corresponding pixels of the reference image 25.

The warping module 16 warps ones of the source images to a reference coordinate system 27 (FIG. 1) based on the sets of motion vectors 24 (FIG. 2, block 28). In the embodiments illustrated herein, the reference coordinate system 27 corresponds to the coordinate system of the designated reference image 25. In these embodiments, there is no need for the warping module 16 to warp the reference image 25 to the reference coordinate system 27; instead, the warping module 16 "warps" the reference image 25 by simply passing the reference image 25 through to the next processing module. With respect to these embodiments, the reference image and the neighboring images that are output from the warping module are referred to herein as "warped images"). In other embodiments, however, the reference coordinate system 27 does not correspond to the coordinate system of the reference image 25. For example, the reference coordinate system 27 may have a spatial orientation with respect to the scene that is different from the coordinate system of the reference image 25 or the reference coordinate system 27 may have a different spatial resolution than the coordinate system of the reference image 25. In these other embodiments, the warping module 16 warps all the source images 22 to the reference coordinate system 27.

The quality parameter computation module 18 computes quality parameter values 32 for each of the non-reference ones of the warped images 30 in the reference coordinate system 27 (FIG. 2, blocks 34 and 36). In particular, for each of the non-reference ones of the warped images 30, the quality parameter computation module 18 computes a respective set of one or more measures of alignment confidence between the non-reference warped image and the reference image 25 in the reference coordinate system 27 (FIG. 2, block 34). The quality parameter computation module 18 also identifies saturated pixels and unsaturated pixels in the warped images 30 (FIG. 2, block 36).

The output image generation module 20 generates the output image 22 with pixel value contributions from unsaturated pixels in the warped images based on the computed alignment accuracy measures (FIG. 2, block 38). As explained above, some embodiments of the image processing system 10 generate the output image 22 with the same spatial resolution as the source images 12. These embodiments are described in detail in section II below. Other embodiments of the image processing system 10 generate the output image 22 with a higher spatial resolution than the source images 12. These embodiments are described in detail in section III below.

II. GENERATING A HIGH DYNAMIC RANGE OUTPUT IMAGE WITH THE SAME SPATIAL RESOLUTION AS THE SOURCE IMAGES

Figure 3:
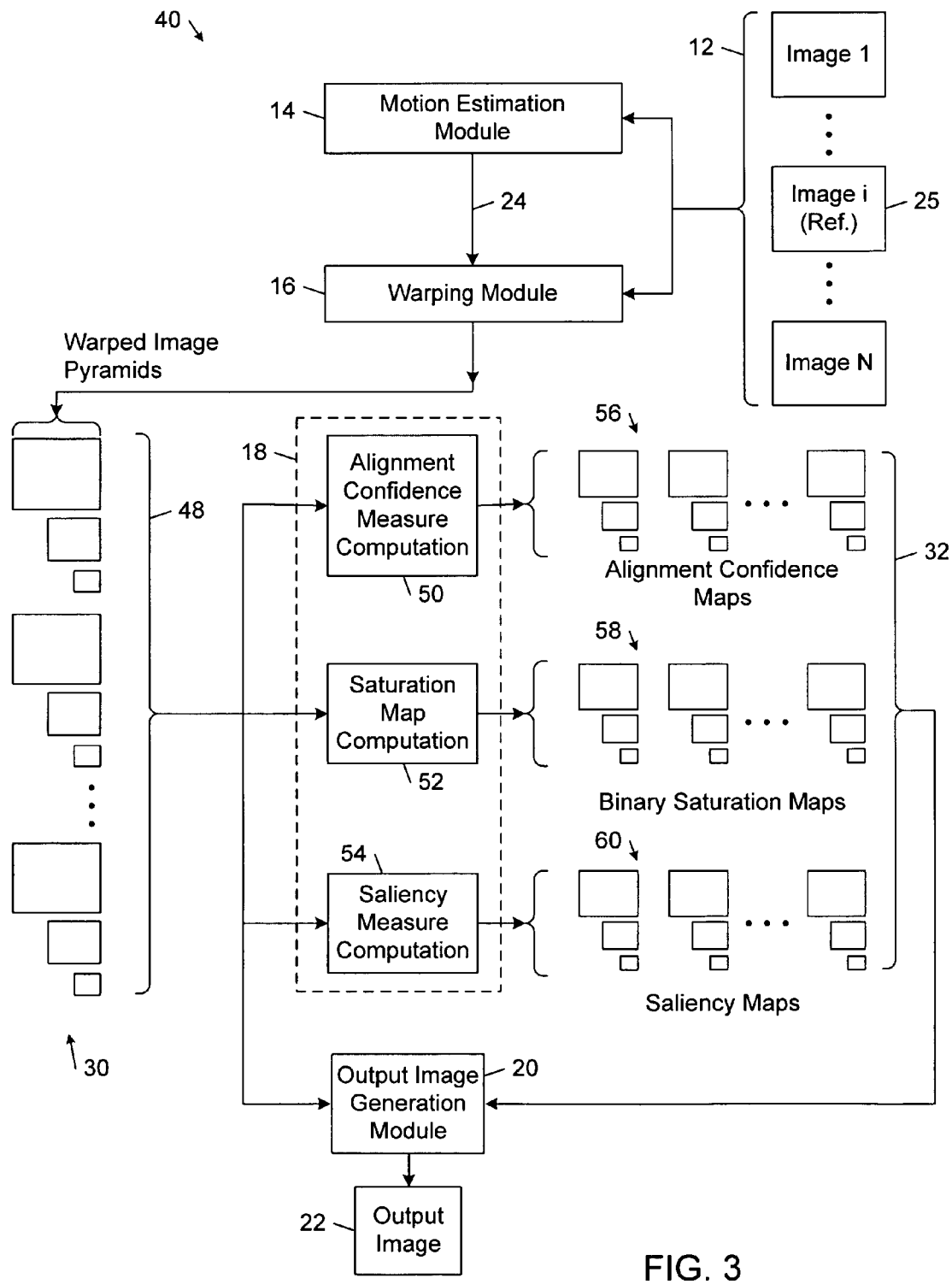
FIG. 3 is a block diagram of an embodiment of the image processing system shown in FIG. 1.

FIG. 3 shows an embodiment 40 of the image processing system 10 that generates the output image 22 with the same spatial resolution as the source images 12.

A. Calculating Motion Vectors

As explained above, the motion estimation module 14 computes respective sets of motion vectors 24 that establish correspondences between respective pairs of the source images 12. In this process, the motion estimation module 14 computes a respective motion map (or motion correspondence map) for each pairing of the reference image 25 and a respective neighboring image. Each motion map includes a set of motion vectors $u_{r,t}$ that map pixels $P_t$ of the reference image $I_r$ to corresponding pixels $P_t$ of the neighboring images $I_t$. The motion vectors estimate the inter-frame motion of features or objects appearing in the base images 12.

In general, the motion estimation module 14 may compute the motion vectors 24 based on any model for estimating the motion of image objects. In one example, the motion vectors 24 are computed based on an affine motion model that describes motions that typically appear in image sequences, including translation, rotation, zoom, and shear. Affine motion is parameterized by six parameters as follows:

$$U_x(x,y) = a_{x0} + a_{x1}x + a_{x2}y \quad (1)$$

$$U_y(x,y) = a_{y0} + a_{y1}x + a_{y2}y \quad (2)$$

wherein $U_x(x,y)$ and $U_y(x,y)$ are the x and y components of a velocity motion vector at point (x,y), respectively, and the $a_k$'s are the affine motion parameters. The motion maps of image pairs may be represented as vector fields in the coordinate system of the reference image. A vector field U(P), the reference image $I_r(P)$, and the neighboring image $I_t(P)$ (e.g., one of the images preceding or succeeding the image to be enhanced in a image sequence), satisfy:

$$I_r(P) = I_t(P - U(P)) \quad (3)$$

where P=P(x,y) represents pixel coordinates.

In a typical image sequence of source images 12, if the motion vectors 24 are computed correctly the warped neighboring image should look very similar to the corresponding reference image 25. In the case of differently exposed source images 12 that are captured by a single camera, the reference and neighboring images are captured at two different times. As a result, the pixel motion between the reference and neighboring images typically is due to both camera motion and the motion of scene points moving independently of the camera. In some embodiments, the motion estimation module 14 accounts for the unconstrained (non-parametric) motion of pixels by computing movements of individual pixels or groups of pixels from each neighboring source image to the reference image 25. In other embodiments, the motion estimation module 14 computes motion vectors describing movements of individual pixels or groups of pixels between neighboring source images and derives the motion vectors 24 for each given neighboring source image from a respective concatenation of the motion vectors between each pair of neighboring source images from the given source image to the reference image 25. The motion vectors 24 may be computed for one or both of forward and backwards transitions between each of the neighboring source images and the reference image 25.

Figure 4:
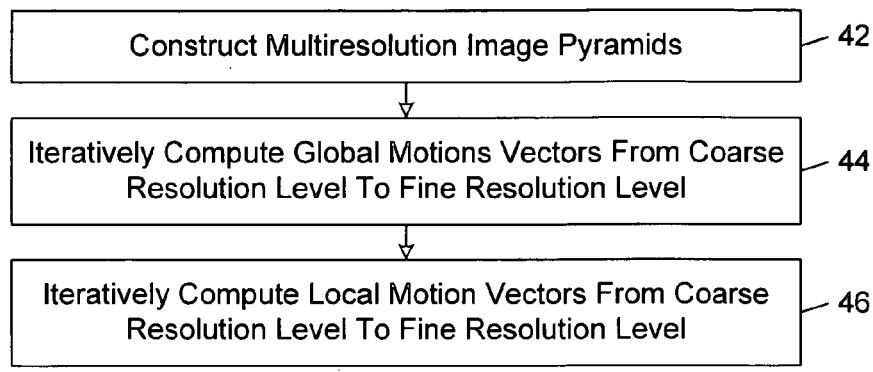
FIG. 4 is a flow diagram of an embodiment of a method of calculating motion vectors establishing correspondences between respective pairs of source images.

FIG. 4 shows an embodiment of a method of computing motion vectors in which the motion estimation module 14 uses a pyramid-based hierarchical image alignment technique to align each neighboring source image with the designated reference image 25. In this embodiment, the reference and neighboring image pairs are represented by Laplacian multiresolution pyramids or Gaussian multiresolution pyramids. This embodiment is able to accommodate a wide range of displacements, while avoiding excessive use of computational resources and generation of false matches. In particular, using a multiresolution pyramid approach allows large displacements to be computed at low spatial resolution. Images at higher spatial resolution are used to improve the accuracy of displacement estimation by incrementally estimating finer displacements. Another advantage of using image pyramids is the reduction of false matches, which is caused mainly by the mismatches at higher resolutions under large motion. Motion estimation in a multiresolution framework helps to eliminate problems of this type, since larger displacements are computed using images of lower spatial resolution, where they become small displacements due to sub-sampling.

In accordance with this method, the motion estimation module 14 constructs multiresolution image pyramids from the source images (FIG. 4, block 42). A Laplacian or Gaussian pyramid is constructed from each respective pair of the source images 22. The motion estimation module 14 iteratively computes global motion vectors from a coarse resolution level to a fine resolution level (FIG. 4, block 44). Within each pyramid level the sum of squared differences (SSD) measure integrated over regions of interest (which is initially the entire image region) typically is used as a match measure:

$$E(U(P)) = \sum_P (I_r(P) - I_t(P - U(P)))^2 \quad (4)$$

where I is the Laplacian or Gaussian filtered image value. The sum is computed over all the points P within the region and is used to denote the SSD error of the entire motion field within that region. The motion field is modeled by a set of global parameters (e.g., plane parameters) and local parameters (e.g., optical flow) as described above.

Numerical methods, such as Gauss-Newton minimization, typically are applied to the objective function described in equation (5) in order to estimate the unknown motion parameters and the resulting motion vectors. Starting with some initial values (typically zero), the hierarchical motion estimation algorithm iteratively refines the parameters in order to minimize the SSD error described in equation (4) from coarse to fine resolutions. After each motion estimation step, the current set of parameters is used to warp the neighboring image to the coordinate frame of the reference image, in accordance with the transformation defined below in equation (7), in order to reduce the residual displacement error between the images.

In some embodiments, the motion estimation module 14 compensates for brightness variations across multiple exposure source images by normalizing the source images 12 at each pyramid resolution level. In some of these embodiments, the motion estimation module 14 performs intensity equalization at each resolution level of Gaussian image pyramids before estimating the motion vectors. In this process, the motion estimate module 14 normalizes the multiresolution images to remove global changes in mean intensity and contrast. In other ones of the embodiments, the motion estimation module 14 applies local contrast normalizations at each resolution level of the Laplacian image pyramids before estimating the motion vectors 24.

In some embodiments, the motion estimation module 14 performs contrast normalization by stretching the histogram of brightness values in each image over the available brightness range. In this process, the brightness values in a given image are mapped over a range of values from 0 to $2^B - 1$, which are defined as the minimum and the maximum brightness of the available intensity range, respectively. In one embodiment, brightness values are mapped over the available range in accordance with the general transformation defined in equation (5):

$$b[m,n] = \begin{cases} 0 & a[m,n] \le p_{low} \\ (2^B-1) \cdot \dfrac{a[m,n]-p_{low}}{p_{high}-p_{low}} & p_{low} < a[m,n] < p_{high} \\ 2^B-1 & a[m,n] \ge p_{high} \end{cases} \quad (5)$$

In equation (6), $p_{low}$ and $p_{high}$ represent predefined or user-defined brightness values within the available range. For example, in some implementations, the $p_{low}$ may be set to the brightness value corresponding to the 1% value of the available range and $p_{high}$ may be set to the brightness value corresponding to the 99% value of the available range. When $p_{low}$ and $p_{high}$ are set to the maximum and minimum brightness values of the available range, the transformation of equation (6) may be expressed as:

$$b[m,n] = (2^B-1) \cdot \frac{a[m,n] - \text{minimum}}{\text{maximum} - \text{minimum}} \quad (6)$$

In some embodiments, the motion estimation module 14 performs intensity equalization in accordance with a histogram equalization process in accordance with which the intensity histograms of the images are normalized to a "standard" histogram. In one exemplary implementation, the intensity histogram of each of the images is mapped into a quantized probability function that is normalized over the range of values from 0 to $2^B-1$, which correspond to the minimum and the maximum brightness of the available intensity range, respectively.

The global motion vectors are used as a starting point for the motion estimation module 14 to iteratively compute local motion vectors from a coarse resolution level to a fine resolution level (FIG. 4, block 46). The process of computing the local motion vectors is similar to the process of computing the global motion vectors described above, except that the motion vectors are computed for local regions of the neighboring images. The fine resolution level at which the local motion vectors are computed may be the same as or finer than the fine resolution at which the global motion vectors are computed. In some embodiments, the local motion vectors are calculated down to the resolution level of the source images (i.e., the pixel level).

B. Warping the Source Images

The warping module 16 warps each of the neighboring source images to the reference coordinate system 27 (e.g., the coordinate system of the reference image 25 in the illustrated embodiments) in accordance with the following transformation, which is derived from equation (3) above:

$$I_t^w(P) = I_t(P - U(P)) \quad (7)$$

where $I_t^w(P)$ is the warped neighboring source image.

In some embodiments, the warping module 16 computes one or more multiresolution image pyramids 48 from each the warped source images 12. As explained in detail below, the warped image pyramids 48 may include Gaussian image pyramids, Laplacian image pyramids, or both Gaussian image pyramids and Laplacian image pyramids, depending on the process by which the output image generation module 20 generates the output image 22.

C. Computing Quality Parameters

As explained above, the quality parameter computation module 18 computes quality parameter values 32 for each of the warped images 30 in the reference coordinate system 27. In the image processing system 40, the quality parameter computation module 18 performs the following computations on each of the warped image pyramids 48: an alignment confidence measure computation 50, a saturation map computation 52, and a saliency measure computation 54.

1. Computing Alignment Confidence Maps

The quality parameter computation module 18 computes a set of multiresolution alignment confidence maps 56 for each pairing of the reference source image and a respective neighboring source image based on the warped image pyramids 48. In the image processing system 40, the quality parameter computation module 18 computes a respective pyramid of alignment confidence maps 56 from each of the warped image pyramids 48, where each alignment confidence map 56 is derived from a respective one of the images in a respective one of the warped image pyramids 48.

The alignment confidence maps 56 contain alignment confidence measures that are derived from correlations between the reference source image 25 and the warped neighboring source images. In some implementations, the alignment confidence measures, $M_{Align}$, are computed as follows:

$$\text{if } \sigma_{ref}^2 \le \Omega \text{ AND } \sigma_{warped}^2 \le \Omega: \quad (8)$$
$$M_{Align} = \frac{\sum_P (I_{ref}(P) - \overline{I_{ref}})(I_{warped}(P) - \overline{I_{warped}})}{N \sigma_{ref} \sigma_{warped}}$$

$$\text{if } \sigma_{N\_ref}^2 < \Omega_N \text{ AND } \sigma_{N\_warped}^2 < \Omega_N: \quad (9)$$
$$M_{Align} = 1.0, \text{ if } \Delta\mu^2 \le \kappa\Omega$$
$$M_{Align} = 0.0, \text{ else}$$

where $\sigma_{ref}^2$ and $\sigma_{warped}^2$ are the reference image variance and the warped neighboring image variances within the correlation window, respectively; $\sigma_N^2 = \sigma^2/(\mu^2+C)$ is the mean normalized variance with $\mu$ being the mean and c a stabilizing constant to handle close-to-zero mean values; $\Omega$, $\Omega_N$ and $\kappa$ are thresholding parameters, and N is the number of pixels in the correlation window.

In some implementations, composite alignment confidence measures are determined for each spatial resolution level of the warped image pyramids 48 by computing the geometric mean of the alignment confidence measure for each of the color spectral bands (e.g., red, green, and blue) of the warped pyramid images 48.

2. Computing Saturation Maps

In the image processing system 40, the quality parameter computation module 18 identifies saturated pixels and unsaturated pixels in the images of the warped image pyramids 48.

In one implementation, the quality parameter computation module 18 computes a respective pyramid of saturation maps 58 from each of the warped image pyramids 48, where each saturation map 58 is derived from a respective one of the images in a respective one of the warped image pyramids 48. The values, $M_{SAT}$, of the saturation maps are computed from the values, $I_{Warped}$, of the warped images as follows:

$$M_{SAT} = \begin{cases} 0 & \text{if all } I_{Warped} \text{ in } \Theta \ge I_{SAT} \\ 1 & \text{if any } I_{Warped} \text{ in } \Theta < I_{SAT} \end{cases} \quad (10)$$

where $I_{SAT}$ is the saturation threshold value and $\Theta$ is a patch of pixels within the warped image. In one exemplary implementation for pixels with a maximum pixel value of 255, $I_{SAT}$ is set to 255 and Θ consists of a 3×3 square patch of pixels.

3. Computing Saliency Maps

In the image processing system 40, the quality parameter computation module 18 generates from the warped image pyramids 48 saliency maps 60 containing saliency measures describing local texture content and contrast in local regions of the images of the warped image pyramids 48. Each saliency map 60 contains normalized saliency measures that are derived from a respective one of the images in respective ones of the warped image pyramids 48. In the illustrated embodiments, the quality parameter computation module 18 generates the saliency maps by applying one or more saliency feature descriptor functions to Laplacian-filtered ones of the warped image pyramids 48.

In general, any one or more of a wide variety of different types of feature descriptors may be used to describe the local image content within regions of the images. The feature descriptors may be statistical, structural, or syntactic. Exemplary feature descriptors include: the magnitude (amplitude) of pixel values in the warped images; the energy of pixel values in the warped images; the standard deviation of pixel values in the warped images; the skewness of the gradient value distribution in the warped images; and the edge frequency in the warped images. The feature descriptors may be applied to individual pixels or local regions (e.g., block of 5×5 pixels). The quality parameter computation module 18 may use any type of edge detection technique to find edges in the image pyramids. In one implementation, the quality parameter computation module 18 uses a Sobel edge detector to compute edge directions and magnitudes. The Sobel edge detector uses a pair of 3×3 convolution masks to perform a two-dimensional gradient measurement on the images, where one of the convolution masks estimates the gradient in the x-direction (columns) and the other convolution mask estimates the gradient in the y-direction (rows).

D. Generating the Output Image

As explained above, the output image generation module 20 generates the output image 22 from unsaturated pixels in the images based on the computed quality parameter values, including the alignment accuracy measures. In the illustrated embodiments, the output image generation module 20 generates the output image 22 in accordance with either a pixel selection method or a pixel blending method. In general, these methods of generating the output image 22 emphasize pixel value contributions to the output image 22 from unsaturated pixels of the warped source images that are associated with high alignment confidence and high saliency.

1. Pixel Selection Method of Generating the Output Image

Figure 5:
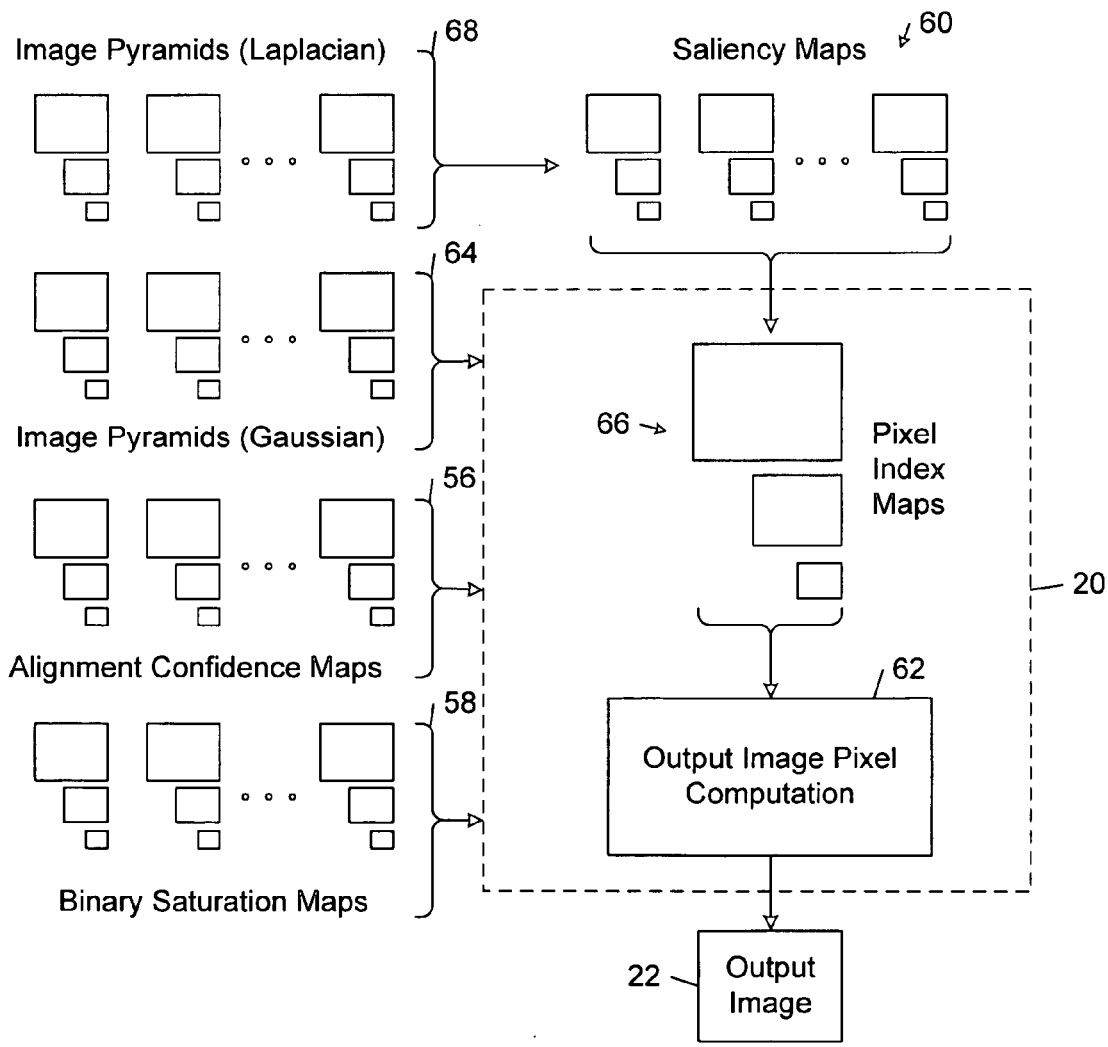
FIG. 5 is a flow diagram of information generated in accordance with an embodiment of the image processing method shown in FIG. 4.

FIG. 5 shows the flow of information that is generated in accordance with an embodiment of the pixel selection method of generating the output image 22. In this embodiment, the output image generation module 20 performs the output image pixel computation 62 based on the binary saturation map pyramids 58, the alignment confidence map pyramids 56, image pyramids 64 corresponding to Gaussian filtered versions of the warped images 48, and a multiresolution pyramid 66 of pixel index maps.

In some embodiments, the output image generation module 20 generates the pixel index maps 66 by rejecting pixels in the warped image pyramids 48 that are saturated or have motion confidence measures below a specified threshold value and then identifying in the pixel index maps the source image associated with a corresponding pixel that was not rejected and has the highest saliency measure. The output image generation module 20 performs this identification process for each pixel location in each pyramid image resolution level. Thus, each pixel in each of the index maps 64 contains an index value that identifies the unrejected source image pixel having the highest saliency measure among the corresponding pixels in all the saliency maps 60 at the corresponding spatial resolution level. In the illustrated embodiment, the output image generation module 20 derives the saliency maps 60 from image pyramids 68 corresponding to Laplacian filtered versions of the warped images that are generated by the warping module 16 (see FIG. 3).

In other embodiments, the output image generation module 20 generates the pixel index maps 66 by rejecting pixels in the warped image pyramids 48 that are saturated or have motion confidence measures below a specified threshold value and then identifying in the pixel index maps the source image associated with a corresponding pixel that was not rejected and is associated with the highest exposure. Thus, each pixel in each of the index maps 64 contains an index value that identifies among the corresponding pixels in all the warped images at the corresponding spatial resolution level of the unrejected source image pixel that is from the source image having the highest exposure level.

Figure 6:
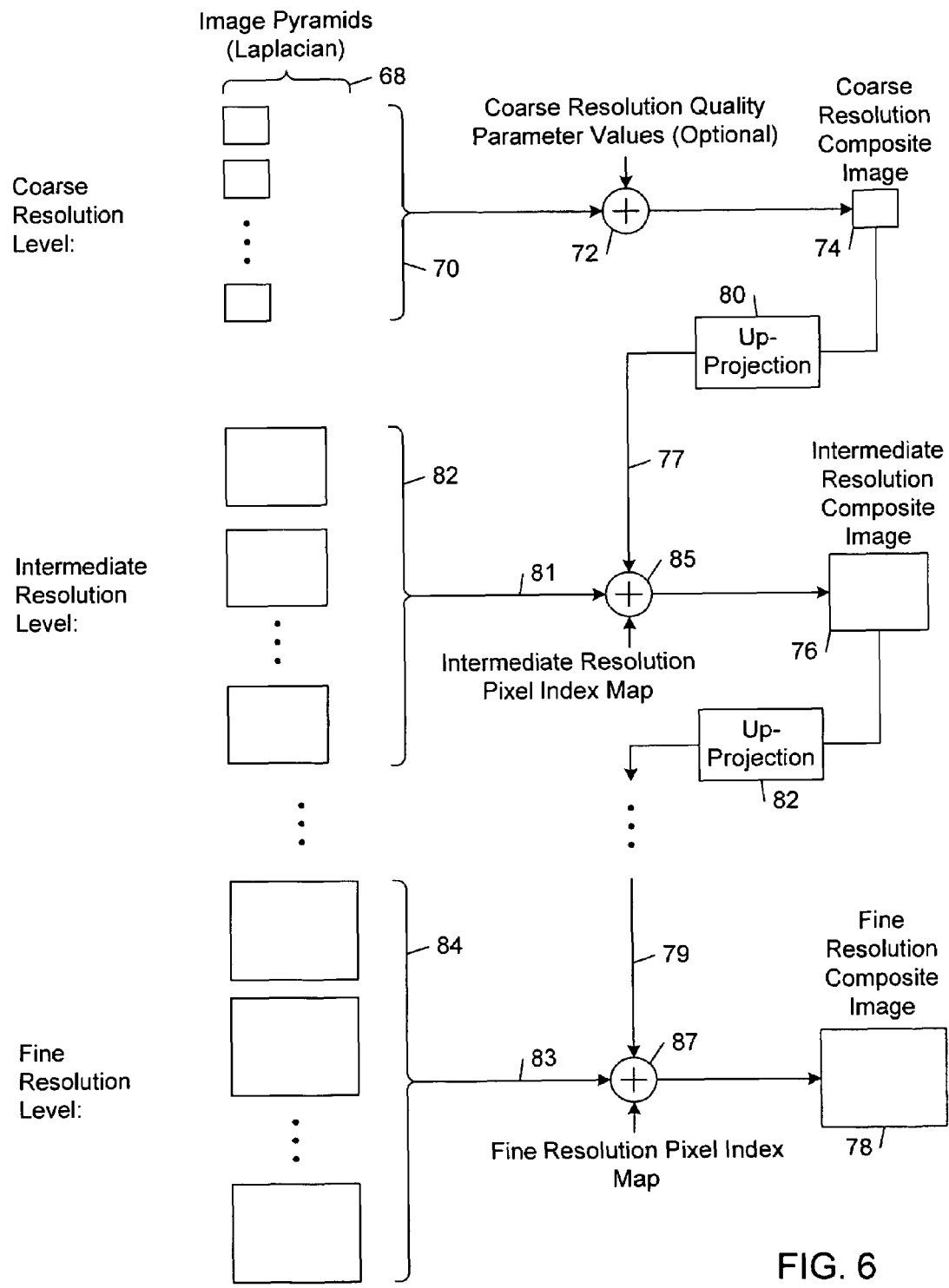
FIG. 6 is a flow diagram of an embodiment of a method of generating an output image in accordance with an embodiment of the image processing method shown in FIG. 4.

FIG. 6 shows an embodiment of a method in accordance with which the output image generation module 20 performs the output image pixel computation 62. In this embodiment, the output image pixel values are computed using a multi-resolution coarse-to-fine pixel value computation process.

At the coarse spatial resolution level, the coarse resolution images 70 of the Laplacian image pyramids 68 are combined 72 to generate the pixel values of a composite image 74. The coarse resolution images 70 may be combined in different ways. In a first approach, the composite image 74 is generated by averaging the values of the corresponding pixels at each pixel location across all the coarse resolution images 70. In a second approach, the composite image 74 is generated by computing a weighted combination of the values of the corresponding pixels at each pixel location across all the coarse resolution images 70. In the second approach, each of the pixels of the coarse image resolution images 70 is weighted by the inverse of the difference between of the exposure time of the corresponding source image and the exposure time of the reference image. In a third approach, each pixel of the composite image 74 corresponds to a pixel-wise blending of the corresponding pixel values identified in the coarse resolution pixel index map weighted in accordance with the respective alignment confidence measures that are associated with the pixels. If all of the corresponding pixels of the coarse resolution images 70 are rejected, the composite image 74 is assigned the value of the corresponding pixel of the coarse image derived from the reference image 25.

At each resolution level above the coarse resolution level, the corresponding composite image 76, 78 is a combination of the pixel values from the Laplacian image pyramids 68 at the corresponding resolution level selected in accordance with the corresponding pixel index map 66 and the values of corresponding pixels in respective up-projected versions 77, 79 of the composite images 74, 76 that are generated at the preceding, coarser resolution levels.

Thus, with respect to the exemplary illustration shown in FIG. 6, the output image generation module 20 performs up-projection 80 on the coarse resolution composite image 74. The output image generation module 20 then generates the intermediate resolution composite image 76 from a combination of the pixel values of the up-projected coarse resolution composite image 77 with the corresponding pixels of the intermediate resolution pyramid images 82 that are identified in the intermediate resolution pixel index map 66. The output image generation module 20 then performs up-projection 82 on the intermediate resolution composite image 76. The output image generation module 20 generates the fine resolution composite image 78 from a combination of the pixel values of the up-projected intermediate resolution composite image 79 with the corresponding pixels of the fine resolution pyramid images 84 that are identified in the fine resolution pixel index map 66. The output image generation module 20 outputs the fine resolution composite image 76 as the output image 22.

The images 81, 83 that are generated during the pixel selection processes 85, 87 may be combined with the up-projected versions 77, 79 of the composite images 74, 76 generated at the preceding, coarser resolution level in any of a wide variety of ways. In some embodiments, the images 85, 86 and the up-projected composite images 77, 79 are averaged to produce the corresponding composite images 76, 78.

2. Pixel Blending Method of Generating the Output Image

Figure 7:
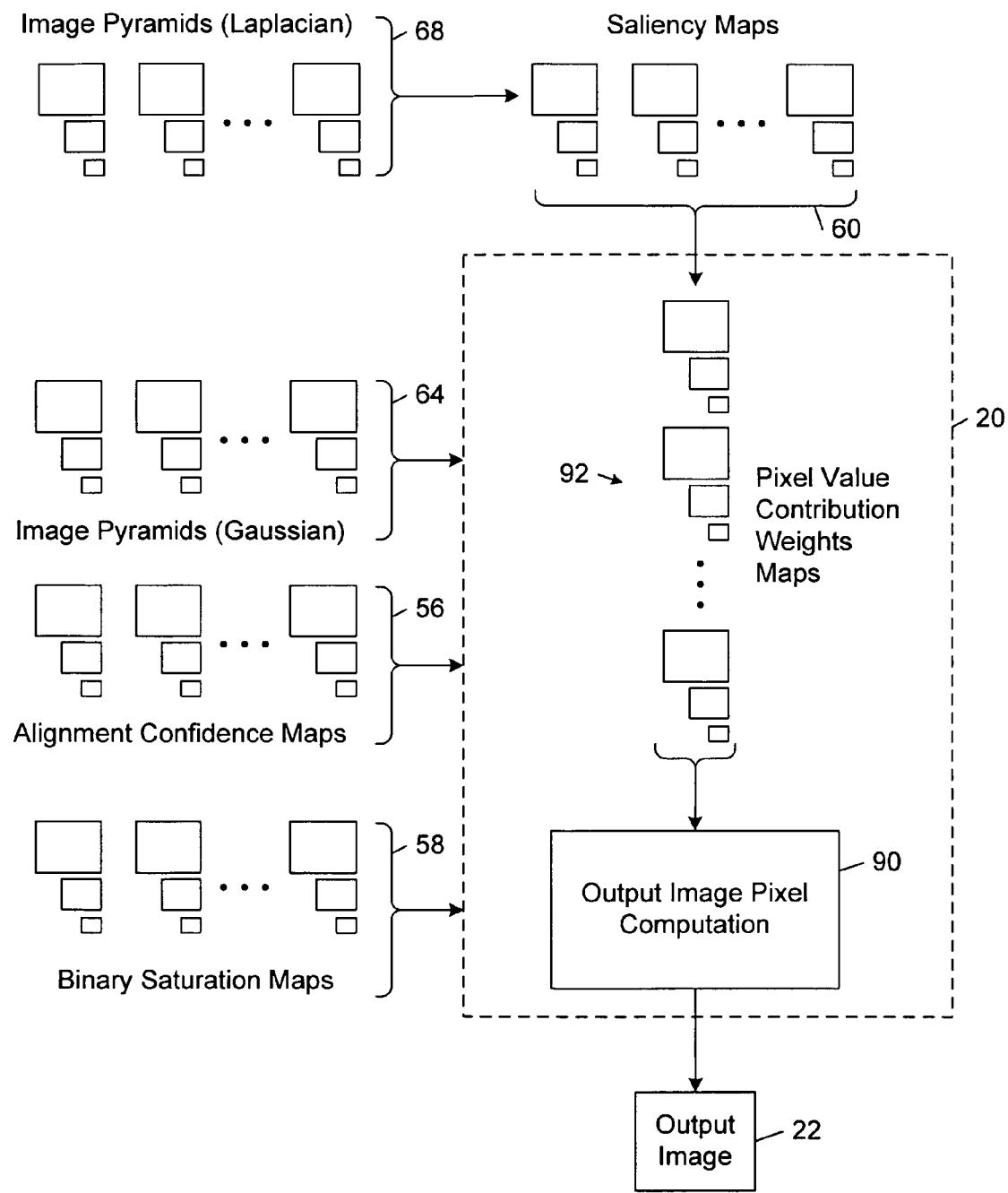
FIG. 7 is a flow diagram of information generated in accordance with an embodiment of the image processing method shown in FIG. 4.

FIG. 7 shows the flow of information that is generated in accordance with an embodiment of the pixel selection method of generating the output image 22. In this embodiment, the output image generation module 20 performs the output image pixel computation 90 based on the binary saturation map pyramids 58, the alignment confidence map pyramids 56, image pyramids 64 corresponding to Gaussian filtered versions of the warped images 48, and multiresolution pyramids 92 of pixel value weights maps.

The output image generation module 20 generates the weights map pyramids 92 based on the saliency maps 60, which are derived from the Laplacian image pyramids 68 in accordance with any of the saliency measure calculation methods described above in connection with the pixel selection method of generating the output image 22.

Figure 8:
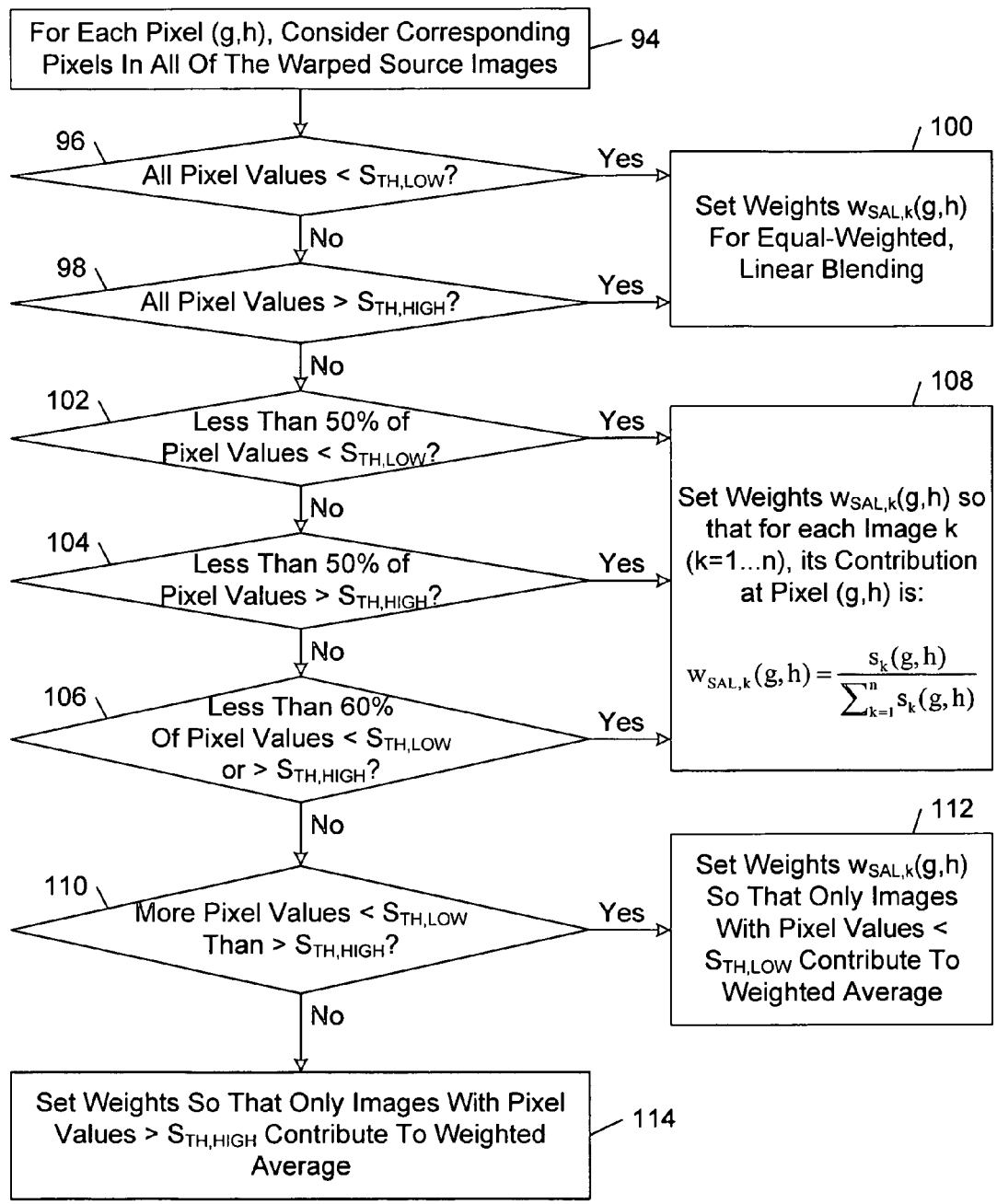
FIG. 8 is a flow diagram of a method of computing weights in accordance with an embodiment of a pixel blending method of generating an output image.

FIG. 8 shows an embodiment of a method by which the output image generation module 20 computes the weights map pyramids 92. In accordance with this method, the output image generation module 20 applies a low saliency threshold ($S_{TH,LOW}$) and a high saliency threshold ($S_{TH,HIGH}$) to the saliency maps 60 on a per-pixel basis at each level of the saliency map pyramids 60. For each pixel (g,h) of the output image 22, the corresponding pixels in all of the warped source images 48 (i.e., source images k=1, . . . , n) are considered (FIG. 8, block 94).

If all of the corresponding pixels have saliency measures below the low saliency threshold ($S_{TH,LOW}$) (FIG. 8, block 96) or all of the corresponding pixels have saliency measures above the high saliency threshold ($S_{TH,HIGH}$) (FIG. 8, block 98), then the weights $w_{SAL}(k)$ are set for an equal-weighted, linear blending of the corresponding pixel values (FIG. 8, block 100).

If less than 50% of the corresponding pixels have saliency measures $s_k(g,h)$ below the low saliency threshold ($S_{TH,LOW}$) (FIG. 8, block 102) or less than 50% of the corresponding pixels have saliency measures $s_k(g,h)$ above the high saliency threshold ($S_{TH,HIGH}$) or less than 60% of the corresponding pixels have saliency measures $s_k(g,h)$ either below the low saliency threshold ($S_{TH,LOW}$) (FIG. 8, block 104) or above the high saliency threshold ($S_{TH,HIGH}$) (FIG. 8, block 106), then the weights $w_{SAL,k}(g,h)$ are set so that for each image k (k=1, . . . , n), its contribution at pixel (g,h) is weighted by:

$$w_{SAL,k}(g, h) = \frac{s_k(g, h)}{\sum_{i=1}^{n} s_i(g, h)} \quad (11)$$

In this case, every image contributes to the weighted average.

If there are more corresponding pixels with saliency measures $s_k(g,h)$ below the low saliency threshold ($S_{TH,LOW}$) than above the high saliency threshold ($S_{TH,HIGH}$) (FIG. 8, block 110), then the weights $w_{SAL,k}(g,h)$ are set so that only images k with pixel values below the low saliency threshold ($S_{TH,LOW}$) contribute to the weighted average (FIG. 8, block 112). Otherwise, the weights $w_{SAL,k}(g,h)$ are set so that only images k with pixel values above the high saliency threshold ($S_{TH,HIGH}$) contribute to the weighted average (FIG. 8, block 114).

Figure 9:
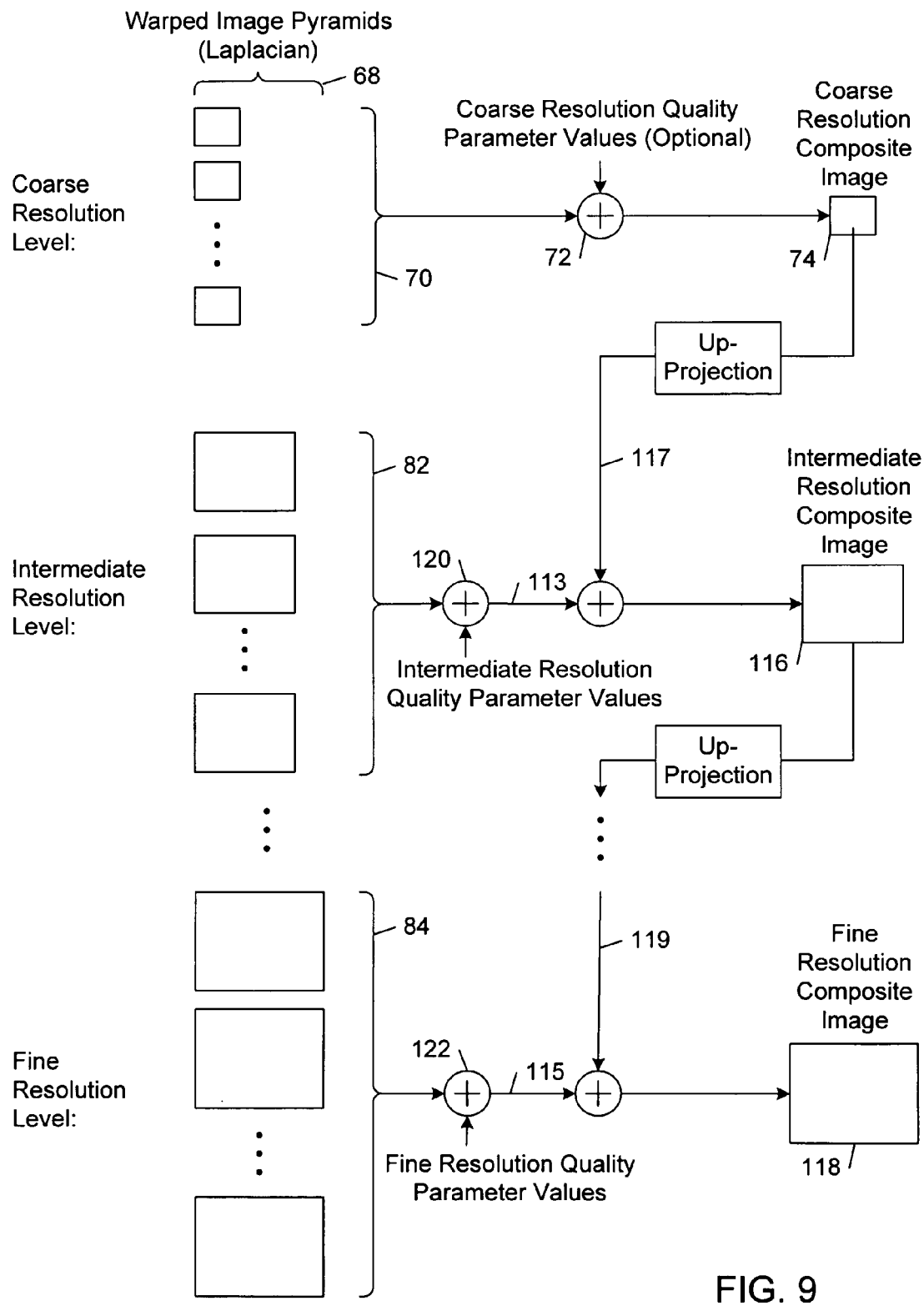
FIG. 9 is a flow diagram of information generated in accordance with an embodiment of the image processing method shown in FIG. 4.

FIG. 9 shows an embodiment of a method in accordance with which the output image generation module 20 performs the output image pixel computation 90. In this embodiment, the output image pixel values are computed using a multi-resolution coarse-to-fine pixel value computation process.

At the coarse spatial resolution level, the coarse resolution images 70 of the Laplacian image pyramids 68 are combined 72 to generate the pixel values of a composite image 74. The composite image 74 may be generated in accordance with any of the approaches described above in connection with the pixel selection method shown in FIG. 6.

At each resolution level above the coarse resolution level, the corresponding composite image 116, 118 is a combination of images 113, 115, which are derived from a weighted blending 120, 122 of the pixel values from the Laplacian image pyramids 68 at the corresponding resolution level, and the values of corresponding pixels in respective up-projected versions 117, 119 of the composite images 74, 116 that are generated at the preceding, coarser resolution levels.

The output image generation module 20 computes the weighted blending of the pixel values from the Laplacian image pyramids 68 at the corresponding resolution level as follows. If for a given output pixel (g,h), all of the corresponding pixels of the neighboring warped source images are either saturated or have alignment confidence measures below the specified alignment confidence threshold, the output image generation module 20 sets the given output pixel $I_{Blended}(g,h)$ to the value of the corresponding pixel in the reference image. Otherwise, the output image generation module 20 performs the output image calculation 90 in accordance with equation (12):

$$I_{Blended}(g, h) = \frac{\sum_k \omega_{SAT,k}(g, h) \cdot \omega_{SAL,k}(g, h) \cdot \omega_{CON,k}(g, h) \cdot I_k(g, h)}{\sum_k \omega_{SAT,k}(g, h) \omega_{SAL,k}(g, h) \cdot \omega_{CON,k}(g, h)} \quad (12)$$

where $I_{Blended}(g, h)$ is the synthesized pixel value of the blended image generated from the corresponding pixels $I_k(g, h)$ of the warped images k, $\omega_{SAT,k}(g,h)$ is obtained from the corresponding binary saturation map 58 and has a value of 0 if the pixel (g,h) in warped image k is saturated and a value of 1 is the pixel (g,h) in warped image k is unsaturated, $\omega_{SAL,k}(g,h)$ is the saliency-based weight for each pixel (g,h) of the warped image k, and $\omega_{CON,k}(g,h)$ is a pixel-wise weight related to the alignment confidence measure. In some embodiments, the weights $\omega_{CON,k}(g,h)$ are set to values that are proportional to the computed pixel-wise alignment confidence measure if the measure is above a specified alignment confidence threshold; otherwise they are set to zero. The weights $\omega_{CON,k}(g,h)$ may vary from pixel to pixel, and from image to image. During the rendering process, the alignment-confidence-related weighting increases the contribution of relevant and valid information from well-aligned images and decreases the contribution of unreliable information.

The blended images 113, 115 that are generated during the blending processes 120, 122 may be combined with the up-projected versions 117, 119 of the composite images 74, 116 generated at the preceding, coarser resolution level in any of a wide variety of ways. In some embodiments, the blended images 113, 115 and the up-projected composite images 117, 119 are averaged to produce the corresponding composite images 116, 118.

The output image generation module 20 outputs the fine resolution composite image 118 as the output image 22.

In some embodiments, the output image generation module 20 is configured to perform the output image pixel computation without regard to motion. In these embodiments, output image generation module 20 performs the output image pixel computation 90 as described above in connection with FIG. 9, except that equation (12) is replaced by the following equation:

$$I_{Blended}(g, h) = \frac{\sum_k \omega_{SAT,k}(g, h) \cdot \omega_{SAL,k}(g, h) \cdot I_k(g, h)}{\sum_k \omega_{SAT,k}(g, h) \omega_{SAL,k}(g, h)} \quad (13)$$

These embodiments may be particularly applicable to situations in which the source images are captured by a stationary camera (e.g., a camera mounted on a stationary fixture. such as a tripod), and the scene is static.

In some other embodiments, output image generation module 20 performs the output image pixel computation 90 as described above in connection with FIG. 9, except that the saliency measures ($\omega_{SAL,k}(g, h)$) are replaced by measures ($\omega_{S/NL,k}(g,h)$) of signal-to-noise ratio for each pixel (g,h) of the warped image k, as shown in equation (14).

$$I_{Blended}(g, h) = \frac{\sum_k \omega_{SAT,k}(g, h) \cdot \omega_{S/N,k}(g, h) \cdot \omega_{CON,k}(g, h) \cdot I_k(g, h)}{\sum_k \omega_{SAT,k}(g, h) \omega_{S/N,k}(g, h) \cdot \omega_{CON,k}(g, h)} \quad (14)$$

In some implementations, the signal-to-noise ratio measures ($\omega_{S/NL,k}(g,h)$) are computed from parameters of the image sensor that was used to capture the source images 12. For example, in some of these implementations, the signal-to-noise measures are captured in accordance with the methods described in D. Yang and A. El Gamal, "Comparative analysis of SNR for image sensors with widened dynamic range," Proc. SPIE, VOL. 3649, pp. 197-211, February 1999.

III. GENERATING A HIGH DYNAMIC RANGE OUTPUT IMAGE WITH A HIGHER SPATIAL RESOLUTION THAN THE SOURCE IMAGES

A. Overview

Figure 10:
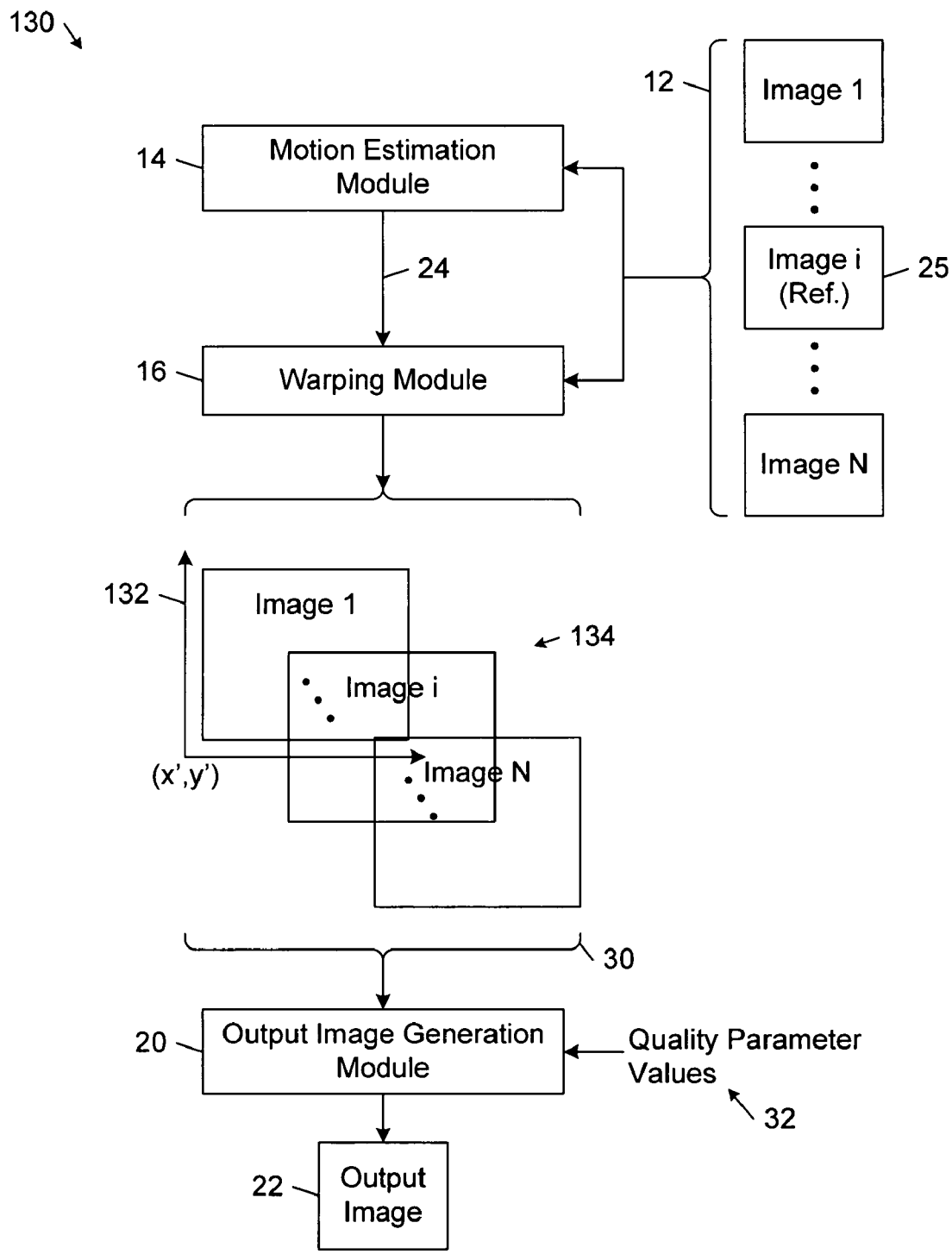
FIG. 10 is a block diagram of an embodiment of the image processing system shown in FIG. 1.

FIG. 10 shows an embodiment 130 of the image processing system 10 that generates the output image 22 with a higher spatial resolution than the source images 12. In this embodiment, the output image 22 has pixels located in the reference coordinate system at an output image resolution level and the source images have pixels located in respective source image coordinate systems at a source image resolution level lower than the output image resolution level.

The motion estimation module 14 computes respective sets of motion vectors 24 at sub-pixel accuracy in accordance with any of the motion vector computation methods described in section II.A above. The sets of motion vectors 24 establish correspondences between respective pairs of the source images 12. In some embodiments, the motion estimation module 14 computes a respective motion map (or motion correspondence map) for each pairing of the reference image 25 and a respective neighboring image. In this process, the motion estimation module 14 computes movements of individual pixels or groups of pixels from each neighboring source image to the reference image 25. In other embodiments, the motion estimation module 14 computes motion vectors describing movements of individual pixels or groups of pixels between neighboring source images and initializes the motion vectors 24 for each given neighboring source image from a respective concatenation of the motion vectors between each pair of neighboring source images from the given source image to the reference image 25.

The warping module 16 warps each of the neighboring source images to the reference coordinate system 132 by a process that involves a re-mapping in accordance with the computed motion vectors 24 and an up-projection from the source image resolution level to the output image resolution level. The re-mapping may be performed at the source image resolution level or the output image resolution level in accordance with the transformation defined in equation (7) above. The up-projection may correspond to any type of resolution re-mapping or up-sampling technique (e.g., bi-cubic interpolation, or a 5-tap Gaussian filter followed by interpolation to achieve sub-pixel accuracy). In the embodiments shown in FIG. 11, the warping module 16 up-projects the source images 12 and the sets of motion vectors 24 from the source image resolution level to the output image resolution level, and then re-maps the up-projected images to the reference coordinate system 132. In the embodiments shown in FIG. 12, the warping module 16 re-maps the source images 12 to a coordinate system that is defined at the source image resolution level and is aligned with the reference coordinate system, and then up-projects the re-mapped source images from the source image resolution level to the output image resolutions level.

The output image generation module 20 generates the output image 22 from unsaturated pixels in the warped images 134 based on the quality parameter values 32 that are associated with the pixels of the warped images 134. The output image generation module 20 computes the values of the pixels of the output image 22 in accordance with the pixel blending method of described in section II.D.2 above, except that equation (12) is replaced by equation (15), which differs from equation (12) by the inclusion of the weights $\omega_{TEMP,k}(g,h)$:

$$I_{Blended}(g, h) = \frac{\sum_k \omega_{TEMP,k}(g, h) \cdot \omega_{SAT,k}(g, h) \cdot \omega_{SAL,k}(g, h) \cdot \omega_{CON,k}(g, h) \cdot I_k(g, h)}{\sum_k \omega_{TEMP,k}(g, h) \cdot \omega_{SAT,k}(g, h) \omega_{SAL,k}(g, h) \cdot \omega_{CON,k}(g, h)} \quad (15)$$

where the weights $\omega_{TEMP,k}(g,h)$ are set to values that are inversely proportional to the temporal distance between the image k containing pixel (g,h) and the designated reference image.

Figure 11:
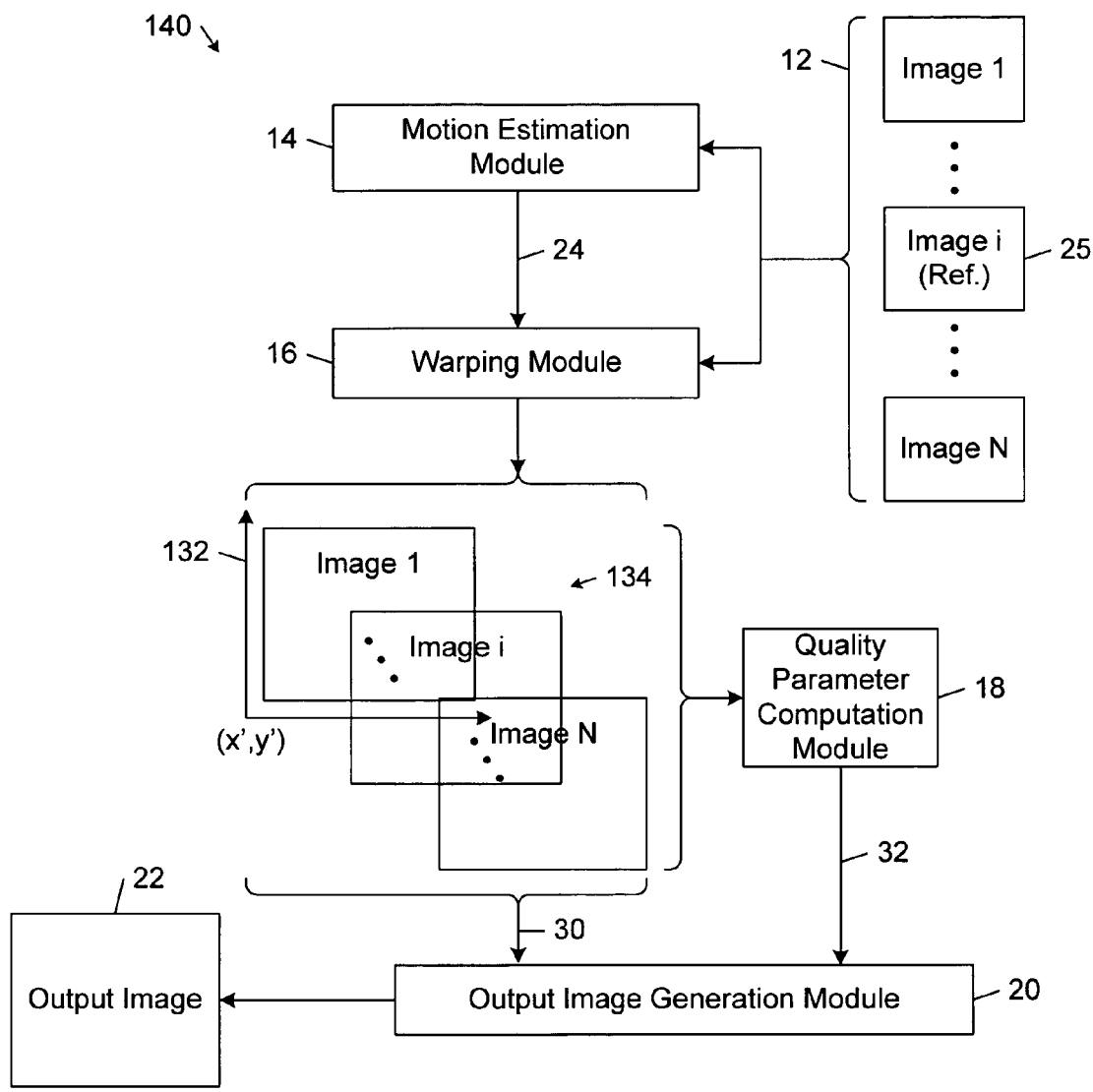
FIG. 11 is a block diagram of an embodiment of the image processing system shown in FIG. 10.

B. Generating the Output Image by Up-Projecting the Source Images Followed by Re-Mapping the Source Images FIG. 11 shows an embodiment 140 of the image processing system 130.

In accordance with this embodiment, the motion estimation module 14 computes respective sets of motion vectors 24 in accordance with any of the motion vector computation methods described above.

The warping module 16 up-projects the source images 12 and the sets of motion vectors 24 from the source image resolution level to the output image resolution level, and then re-maps the up-projected images to the reference coordinate system 132.

The quality parameter computation module 18 computes alignment confidence maps, binary saturation maps, and saliency maps in accordance with the methods described in sections II.C and III.A above, except that these computations are performed on the warped images 134 at the output image resolution level instead of the source image resolution level.

The output image generation module 20 generates the output image 22 from unsaturated pixels in the warped images 134 based on the quality parameter values 32 in accordance with the pixel blending process described in section III.A above.

Figure 12:
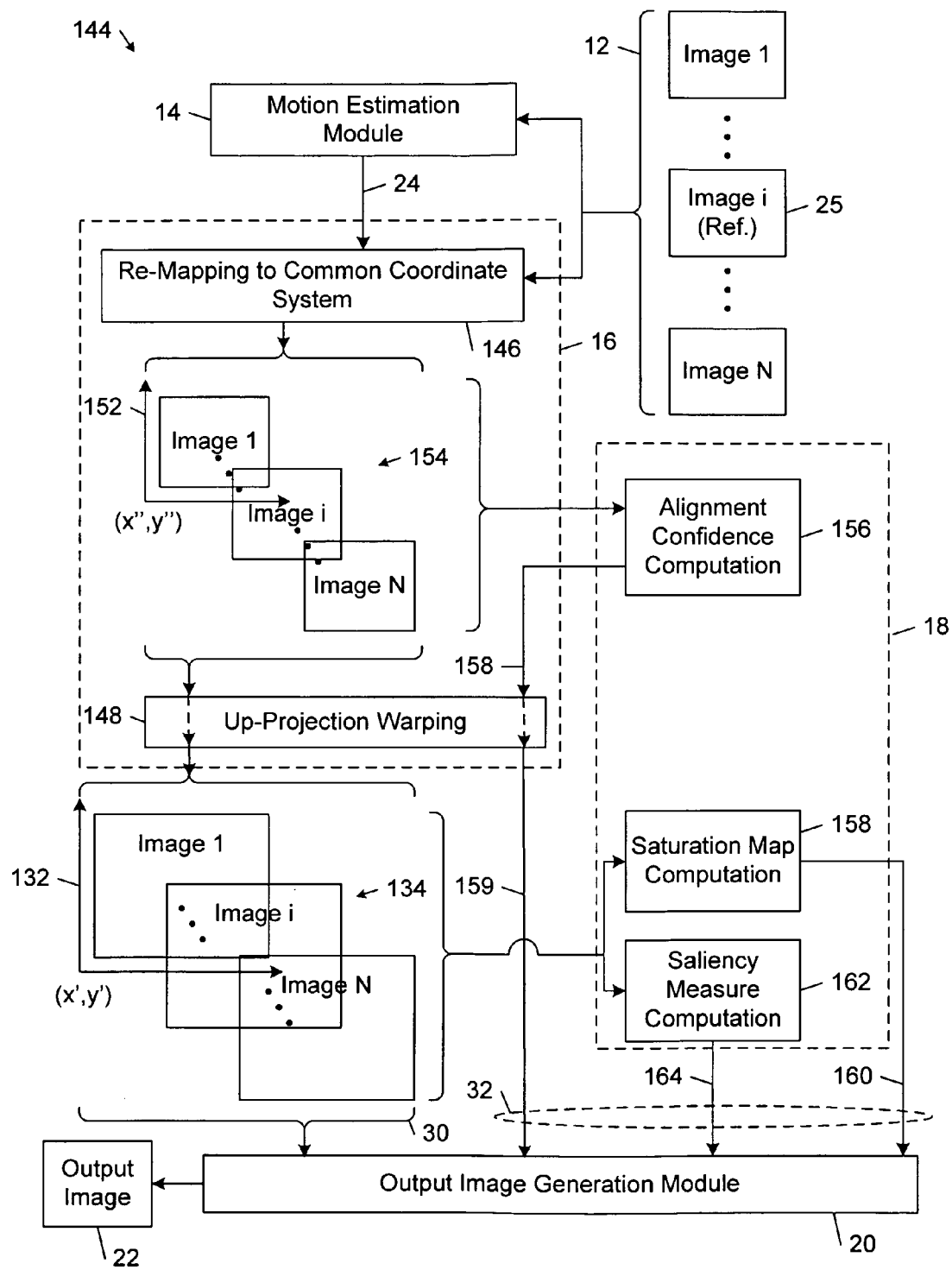
FIG. 12 is a block diagram of an embodiment of the image processing system shown in FIG. 10.

C. Generating the Output Image by Re-Mapping the Source Images Followed by Up-Projecting the Source Images FIG. 12 shows an embodiment 144 of the image processing system 130.

In accordance with this embodiment, the motion estimation module 14 computes respective sets of motion vectors 24 in accordance with any of the motion vector computation methods described above.

The warping module 16 re-maps (FIG. 12, block 146) the source images 12 to a common coordinate system 152 that is aligned with the reference coordinate system 132 and has the same spatial resolution as the source images 12. The warping module 16 up-projects (FIG. 12, block 148) the re-mapped source images 154 from the source image resolution level into the reference coordinate system 132 at the output image resolutions level.

The quality parameter computation module 18 performs an alignment confidence computation 156 on the re-mapped images 154 to produce respective sets of alignment confidence maps 158 in accordance with the methods described in section III.A above. The quality parameter computation module 18 passes the alignment confidence maps 158 to the warping module 16, which up-projects the alignment confidence maps 158 into the reference coordinate system 132. The warping module 16 passes the up-projected alignment confidence maps 159 to the output image generation module 20.

The quality parameter computation module 18 performs a saturation map computation 160 on the up-projected images 134 to produce respective sets of binary saturation maps 160 in accordance with the method described in section II.D.2 above, except that these computations are performed on the warped images 134 at the higher output image resolution level of the reference coordinate system 132 instead of on the warped images 48 at the source image resolution level. The quality parameter computation module 18 also performs a saliency measure computation 162 on the up-projected images 134 to produce the respective sets of saliency maps 164 in accordance with the methods described in section II.D.3 above, except that these computations are performed on the warped images 134 at the higher output image resolution level of the reference coordinate system 132 instead of on the warped images 48 the source image resolution level.

The output image generation module 20 generates the output image 22 from unsaturated pixels in the warped images 134 based on the quality parameter values 32 in accordance with the pixel blending process described in section III.A above.

IV. CONCLUSION

The image processing embodiments that are described herein are able to combine multiple exposure source images in ways that increase dynamic range while reducing blending artifacts in the output image. In these embodiments, the pixel value contributions from the source images to the output image are determined based on one or more respective quality parameter values that are associated with each of the pixels of the source images. The quality parameters enable these embodiments to increase dynamic range while avoiding blending artifacts that otherwise might result from treating all regions of the scene across the source images in the same way.

Other embodiments are within the scope of the claims.

What is claimed is:

1. A machine-implemented method of processing source images including a reference image and one or more non-reference images, the method comprising: one or more processor(s) to perform;

calculating respective sets of motion vectors establishing correspondences between respective pairs of the source images;

warping ones of the source images to a reference coordinate system based on the sets of motion vectors;

for each of the non-reference ones of the warped images, computing a respective set of one or more measures of alignment confidence between the non- reference warped image and the reference image in the reference coordinate system;

identifying saturated pixels and unsaturated pixels in the warped images; and generating an output image with pixel value contributions from unsaturated pixels in the warped images based on the computed alignment confidence measures.

2. The method of claim 1, wherein the computing comprises computing measures of correlation between pixels of the reference image in the reference coordinate system and corresponding pixels of the non-reference ones of the warped images.

3. The method of claim 1, further comprising computing saliency measures describing local texture content and contrast in local regions of the warped images, and assigning the saliency measures to corresponding ones of the pixels in the warped images, wherein the generating comprise classifying pixels in the non-reference ones of the warped images as reliable or unreliable based on comparisons of the corresponding alignment confidence measures with an alignment confidence threshold, and nullifying pixel value contributions to the output image from unreliable pixels in the non-references ones of the warped images.

4. The method of claim 3, wherein the generating comprises identifying in each set of corresponding reliable pixels across the warped images a pixel associated with a highest exposure level, and assigning to pixels of the output image values of corresponding ones of the highest exposure level pixels identified in the sets of corresponding pixels.

5. The method of claim 1, further comprising computing saliency measures describing local texture content and contrast in local regions of the warped images, and assigning the saliency measures to corresponding ones of the pixels in the warped images, wherein the generating comprises determining for each of the pixels in the output image a weighted combination of values of corresponding pixels across the warped images.

6. The method of claim 1, further comprising constructing from the warped images respective multiresolution pyramids of images at different resolution levels ranging from a coarse resolution level to a fine resolution level.

7. The method of claim 6, wherein the computing comprises computing measures of alignment confidence between the non-references ones of the warped images and the reference image in the reference coordinate system for each image in each of the multiresolution pyramids, and computing the alignment confidence measures for images above the coarse resolution level based on alignment confidence measures of lower resolution images in the corresponding multiresolution pyramids.

8. The method of claim 1, wherein the output image has pixels located in the reference coordinate system at an output image resolution level and the source images have pixels located in respective source image coordinate systems at a source image resolution level lower than the output image resolution level, wherein the warping comprises up-projecting the source images and the sets of motion vectors from the source image resolution level to the output image resolution level.

9. The method of claim 8, wherein the warping comprises re-mapping ones of the up-projected source images to the reference coordinate system based on the up-projected sets of motion vectors, and the generating comprises computing for each pixel of the output image a respective combination of pixel value contributions from unsaturated pixels in the up-projected and re-mapped source images weighted based on the sets of alignment confidence measures.

10. The method of claim 9, further comprising computing saliency measures describing local texture content and contrast in local regions of the up-projected re-mapped source images and assigning the saliency measures to corresponding ones of the pixels in the up-projected re-mapped source images, wherein the generating comprises additionally weighting the pixel value contributions from the unsaturated pixels in the up-projected and re-mapped source images based on the assigned saliency measures.

11. The method of claim 9, wherein the generating comprises additionally weighting the pixel value contributions from the unsaturated pixels in the up-projected and re-mapped source images based on measures of temporal distance between the reference image and respective ones of the up-projected and re-mapped source images.

12. The method of claim 1, wherein the output image has pixels located in an output image coordinate system at an output image resolution level and registered in relation to the reference coordinate system, and the source images have pixels located in respective source image coordinate systems at a source image resolution level lower than the output image resolution level, wherein the warping comprises re-mapping the source images to a common reference coordinate system at the source image resolution level, and up-projecting the re-mapped source images and the sets of motion vectors from the source image resolution level to the output image resolution level.

13. The method of claim 12, further comprising up-projecting the re-mapped images and the sets of alignment confidence measures from the source image resolution level to the output image resolution level, wherein the generating comprises computing for each pixel of the output image a respective combination of pixel value contributions from unsaturated pixels in the up-projected images based on the up-projected sets of alignment confidence measures.

14. The method of claim 13, further comprising computing saliency measures describing local texture content and contrast in local regions of the up-projected images and assigning the saliency measures to corresponding ones of the pixels in the up-projected images, wherein the generating comprises additionally weighting the pixel value contributions from the unsaturated pixels in the up-projected images based on the assigned saliency measures.

15. The method of claim 13, wherein the generating comprises additionally weighting the pixel value contributions from the unsaturated pixels in the up-projected images based on measures of temporal distance between the reference image and respective ones of the warped images.

16. The method of claim 1, further comprising determining signal-to-noise measures for respective ones of the pixels in the warped images, wherein the generating comprises determining for each of the pixels in the output image a weighted combination of values of corresponding pixels across the warped images, and the determining comprises weighing pixel value contributions to the weighted combination from pixels in the warped images in accordance with the corresponding alignment confidence measures, pixel saturation measures and the determined signal-to-noise measures.

17. The method of claim 1, wherein the generating Comprises identifying a highest saliency pixel in each set of corresponding pixels across the source images that is assigned a highest saliency measure among the pixels in the set of corresponding pixels, and assigning to pixels of the output image values of corresponding ones of the highest saliency pixels identified in the sets of corresponding pixels.

18. The method of claim 1, wherein the generating Comprises determining for each of the pixels in the output image a weighted combination of values of corresponding pixels across the warped images, wherein the determining comprises weighing pixel value contributions to the weighted combination from reliable pixels in the warped images in accordance with the corresponding alignment confidence measures and the assigned saliency measures.

19. A system for processing source images including a reference image and one or more non-reference images, the system comprising at least one data processing module configured to perform operations comprising:
   calculating respective sets of motion vectors establishing correspondences between respective pairs of the source images;
   warping ones of the source images to a reference coordinate system based on the sets of motion vectors;
   for each of the non-reference ones of the warped images, computing a respective set of one or more measures of alignment confidence between the non-reference warped image and the reference image in the reference coordinate system;
   identifying saturated pixels and unsaturated pixels in the warped images; and
   generating an output image with pixel value contributions from unsaturated pixels in the warped images based on the computed alignment confidence measures.

* * * * *

UNITED STATES PATENT AND TRADEMARK OFFICE
CERTIFICATE OF CORRECTION

| | | |
|---|---|---|
| PATENT NO. | : 7,623,683 B2 | Page 1 of 1 |
| APPLICATION NO. | : 11/403989 | |
| DATED | : November 24, 2009 | |
| INVENTOR(S) | : Mei Chen et al. | |

It is certified that error appears in the above-identified patent and that said Letters Patent is hereby corrected as shown below:

In column 16, line 21, in Claim 1, delete "non- reference" and insert -- non-reference --, therefor.

In column 18, line 22-23, in Claim 17, delete "Comprises" and insert -- comprises --, therefor.

In column 18, line 29-30, in Claim 18, delete "Comprises" and insert -- comprises --, therefor.

Signed and Sealed this

Sixteenth Day of March, 2010

David J. Kappos
*Director of the United States Patent and Trademark Office*